3,390,065
**PROCESS AND CELL FOR THE MANUFAC-
TURE OF EITHER SODIUM HYPOCHLO-
RITE OR CHLORINE**
Hal B. H. Cooper, 4234 Chevy Chase Drive,
Pasadena, Calif. 91103
Filed Apr. 3, 1964, Ser. No. 357,109
17 Claims. (Cl. 204—95)

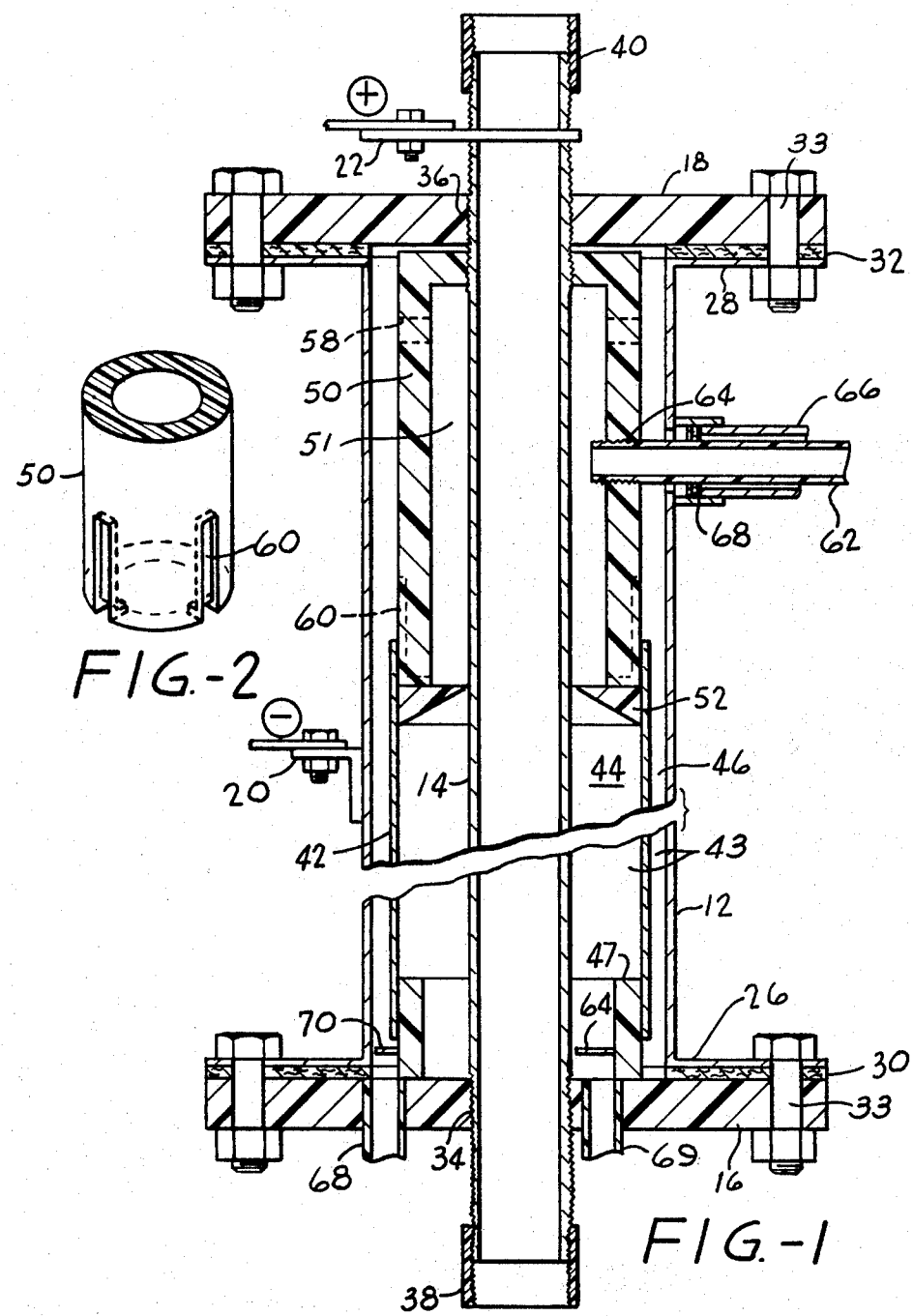

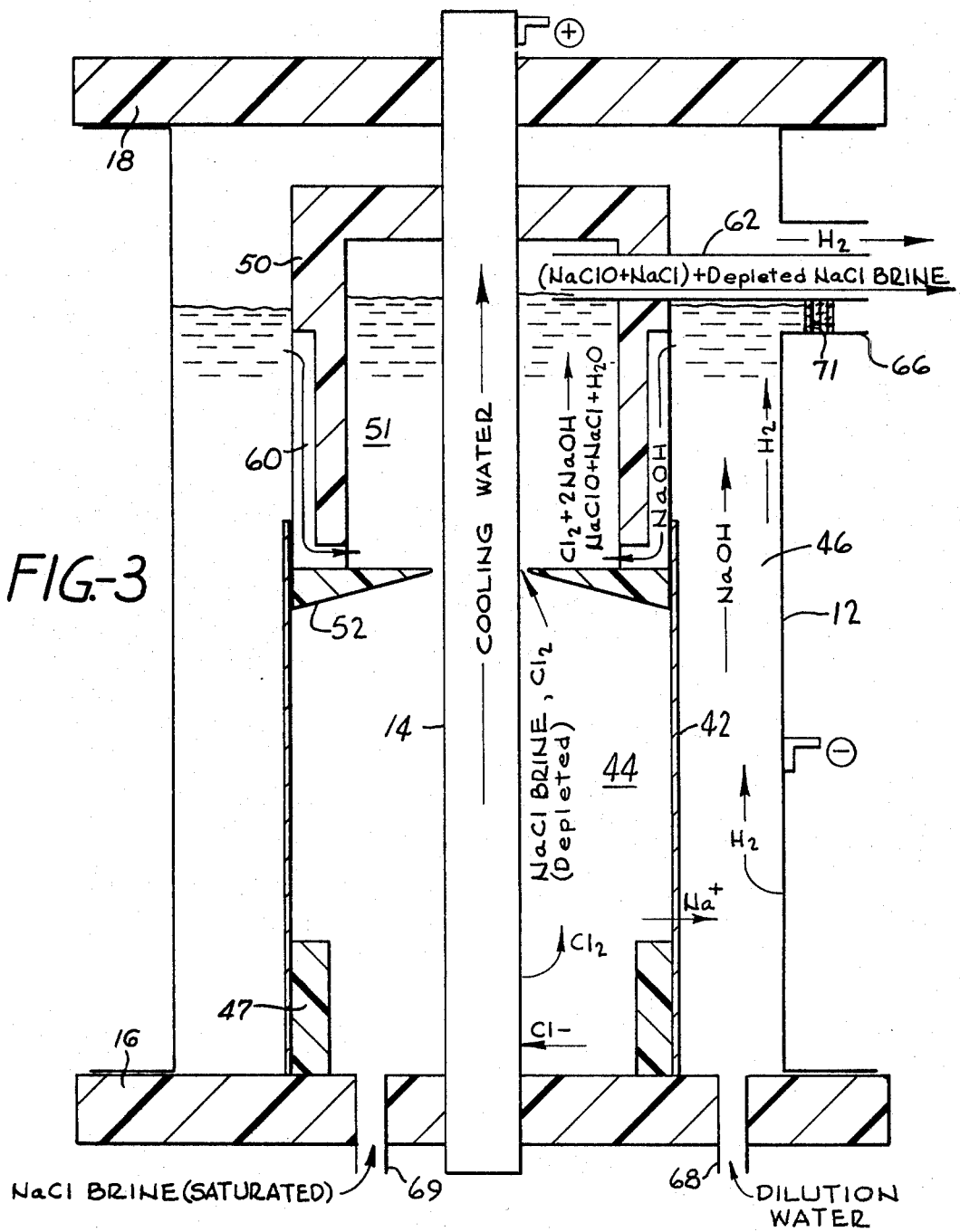

ABSTRACT OF THE DISCLOSURE

A sodium hypochlorite or caustic chlorine generator having concentric tubular electrodes and a tubular diaphragm therebetween with the inner electrode serving as cooling duct for the electrolytic zone and, in the instance, of the hypochlorite application, also as cooling duct for an adjoining reaction zone, where chlorine and caustic from the electrolytic zone react to form sodium hypochlorite.

---

This invention relates to an improved electrolytic cell and to a process for the manufacture of sodium hypochlorite.

Sodium hypochlorite is the most versatile and least expensive of the "active chlorine" agents. In the United States sodium hypochlorite is principally made by the chemical reaction of chlorine and sodium hydroxide in large scale central plants from which it is distributed to the end product, small scale users. The product, however, is corrosive and hazardous to ship, is unstable in storage, and is reasonably stable only in relatively dilute liquid form. The product is conventionally manufactured to contain about 17% sodium hypochlorite and is commonly marketed as a guaranteed 14% sodium hypochlorite solution. Not infrequently, the concentration will drop to 10% sodium hypochlorite or less before it is used during the warm summer months. Sunlight has especially deleterious effects. While it is possible to produce sodium hypochlorite in higher concentrations than the 14–17% range, this is not done because the product is even less stable at the higher sodium hypochlorite concentrations and because sodium chloride deposits as a solid.

In order to avoid the various shortcomings of sodium hypochlorite, other active chlorine agents have been proposed and to some extent used. Solid materials which are more stable in storage and less hazardous to use are marketed. Typical of the solid materials are calcium hypochlorite and the sodium or potassium salts of dichloroisocyanuric acid and other organic chlorine carriers. Some of the solid materials have the advantage of releasing chlorine less rapidly than the sodium hypochlorite solution and of having less oxidative potential for organic materials dissolved in water. In general, however, such improvement in storage stability deriving from the use of the solid materials has been countered by a marked increase in cost per unit of "available chlorine" and by an added problem of satisfactorily dissolving the solid material.

The many disadvantages and higher cost attending the sale of sodium hypochlorite to and use by small scale users and the generally unsuitableness of the suggested substitutes make desirable the devolpment of an "on site" generator which can supply a fresh, nondecomposed product as required.

Prior to the development of the electrolytic chlorine-caustic soda technology in the early 20th century, sodium hypochlorite was produced directly in electrolytic cells. These sodium hypochlorite cells suffered from an inability to attain high sodium hypochlorite concentrations, high consumption of salt per unit of "active chlorine" produced, a number of by-product reactions leading to unwanted materials such as oxygen and sodium chlorate, and generally poor electrical efficiency along with a high salt content in the product. As a result, the hypochlorite cell method of manufacture was abandoned in the United States and the product is produced almost exclusively by the chemical reaction of chlorine and sodium hydroxide, although some electrolytic operations are still carried on in Europe for the manufacture of sodium hypochlorite. The latter electrolytic cells are wholly unsuitable for use in the "on site" generation of sodium hypochlorite for the small scale user. Thus, it is apparent there is a definite need for an improved small scale "on site" generator which employs a low cost, stable, safe material such as sodium chloride for a starting material.

It is another object of the invention to provide an improved electrolytic process and cell for the production of sodium hypochlorite solutions of higher concentrations than heretofore possible with the electrolytic procedure.

It is still another object of the invention to provide a method and cell for the production of sodium hypochlorite that require less sodium chloride per pound of hypochlorite or active chlorine produced and which contains in the product less sodium chloride per pound of hypochlorite or "active chlorine" than heretofore possible with the electrolytic procedure.

It is an object of the invention to provide an electrolytic cell for the production of sodium hypochlorite characterized by a high electrical efficiency.

It is another object of the invention to provide an electrolytic cell of a low cost, simple design, which cell may be used to produce either sodium hypochlorite or chlorine gas with a minimum modification of the cell.

It is a further object of the invention to provide an electrolytic cell having a design that makes it readily movable and accessible.

It is a further object of the invention to provide an essentially automatic unit for the production of sodium hypochlorite that may operate for long periods of time unattended and which requires only a periodic sodium chloride charging.

It is a further object of the invention to provide an improved process for the manufacture of sodium hypochlorite which is attended by a minimum of by-product formation.

It is another object of the invention to provide a hypochlorite or chlorine gas (and sodium hydroxide) generating system especially suitable for the conditioning of water in a swimming pool, cooling tower, or pond, et cetera.

It is a further object of the invention to provide a method and an electrolytic cell especially suitable for the small scale and "on site" production of sodium hypochlorite or chlorine gas (and sodium hydroxide) for an individual user.

It is a further object of the invention to provide an improved electrolytic cell wherein the anode and cathode serve additional purposes of being heat-transfer surfaces, conducting ducts, and a container for the chlorine or sodium hypochlorite generator, thereby leading to a low cost device.

The sodium hypochlorite manufacturing process of the invention and the improved electrolytic cell are especially suitable for use by small scale users. Among these are swimming pools, fishing boats, Laundromats, laundries, restaurants, hospitals, cooling towers, sewage sterilization, water treatment operations, industrial bleaching and chlorination, and the like. The packaging, distribution, and selling costs of sodium hypochlorite and other active chlorine materials for supplying the foregoing markets represent a significant cost to the user and make especially attractive the "on site" generation of an active chlorine material. Additionally, the convenience aspects of the electrolytic cell of the invention, which is substantially automatic, in eliminating the daily chores involved in the use of plant-prepared sodium hypochlorite, make even more attractive the "on site" generation of sodium hypochlorite in accordance with the process of the invention. The electrolytic cell of the invention, while primarily designed for the production of sodium hypochlorite, may be quickly and readily modified to produce chlorine gas when desired. There are certain applications where chlorine gas is preferred to sodium hypochlorite, for example, in the treatment of drinking water, cooling tower water, and some swimming pools, where it is desirable to hold the buildup of dissolved salts to a minimum. The chlorine gas generator has marked advantages for these applications over the use of expensive purchased chlorine in heavy chlorine gas cylinders which must be returned for filling. In remote areas this is a major cost adding negative.

The electrolytic cell of the invention comprises two tubular electrodes, preferably cylindrical, having a common longitudinal axis and mounted between an upper and a lower insulating block with the annular space between the two electrodes serving as the electrolytic zone. A diaphragm, generally tubular, disposed in the electrolytic space between the tubular electrodes divides the electrolytic space into an anode compartment and a cathode compartment. Means are provided for passing a cooling liquid through the inner one of the two tubular electrodes. Preferably, the inner one of the two electrodes serves as the anode and the outer one as the cathode and means are provided for introducing water to the cathode compartment and brine to the anode compartment. The preferred construction material for the diaphragm or membrane is an ion exchange resin that permits migration of sodium ions and restricts passage of chloride and hydroxyl ions thereacross. In the preferred embodiment of the electrolytic cell, means are provided for separating hydrogen from the catholyte prior to mixing of the catholyte and anolyte in a reaction compartment immediately adjoining the electrolytic zone.

It has been found that there are certain conditions and steps that are desirably employed for the production of sodium hypochlorite in order to obtain high sodium hypochlorite concentrations and to minimize the quantity of sodium chloride used and/or found in the product. In the process of the invention a concentrated, preferably saturated, sodium chloride, brine solution is introduced to the anode compartment and electrolyzed to provide a catholyte containing mainly sodium hydroxide and hydrogen and an anolyte comprising chlorine and spent brine solution. The electrolysis is carried on to reduce the salt content of the anolyte in the anode compartment to less than 15% and preferably less than 10% while maintaining the anolyte at a low temperature, preferably less than 50° C. Low temperature operation of the electrolytic cell favors long life of the diaphragm material. With the use of the ion exchange membrane there is little passage of chlorine ions across the membrane into the cathode compartment and the catholyte will generally have less than 1.0% sodium chloride. The anolyte and catholyte are passed to an immediately adjacent or nearby reaction zone and there the two streams are combined to react the sodium hydroxide solution and chlorine to produce sodium hypochlorite with the reaction zone being maintained at a temperature preferably less than 50° C. and desirably in the range of 10° to 35° C. to minimize decomposition of sodium hypochlorite.

In the preferred embodiment of the invention, hydrogen is separated from the catholyte before the mixing of the anolyte and catholyte to produce sodium hypochlorite. The separation of the hydrogen and its exclusion from the reacting anolyte and catholyte streams permit the chlorine and sodium hydroxide reaction to proceed in a smaller reaction zone, since the hydrogen then does not dilute the chlorine gas. It also develops that operation of the anode zone at the relatively low temperatures of less than 50° C. substantially increases the solubility of the chlorine in the anolyte and this also contributes to a faster reaction in the reaction zone.

There is some passage of water with the sodium ion across the diaphragm from the anode compartment into the cathode compartment. However, this water is generally inadequate to dilute the caustic formed in the cathode compartment to the extent desired and for this reason dilution water will generally be introduced to the cathode compartment along with introduction of the brine solution to the anode compartment.

Electrolytic sodium hypochlorite production heretofore has been limited by inability to attain high concentrations. Typically, about 2.5% sodium hypochlorite was produced and there was a large quantity of excess salt which was not converted to sodium hypochlorite; the later usage usually ranged between 5.–10 parts of salt per part of "available chlorine." Under certain less economic operating conditions the concentration of the hypochlorite could be increased to an approximate maximum of 5.0%. As a result, when the lower salt content, high concentration sodium hypochlorite product obtainable from the chemical reaction of sodium hydroxide and chlorine produced by the large scale caustic-chlorine cell became available, direct electrolytic processes and cells faded out of the picture. With the process and electrolytic cell of this invention it is now possible to produce sodium hypochlorite in higher concentrations, of the order of 5 to 12% sodium hypochlorite, and require a lower usage of sodium chloride per unit of "available chlorine" produced in the range of 2–3 parts of salt per part of "available chlorine."

These and other advantages of the apparatus and process of the invention will become more apparent from the following specification and accompanying drawings which are for the purpose of illustration only, and in which:

FIG. 1 is a longitudinal sectional view of a preferred embodiment of the electrolytic cell of the invention;

FIG. 2 is an isometric view of a cylindrical member removed for purposes of illustration from the upper inside portion of the electrolytic cell of FIG. 1; and FIG. 3 is a diagrammatic representation of the electrolytic cell of the invention illustrating the flow pattern of materials through the cell and some of the principal chemical reactions occurring therein.

The electrolytic cell of FIG. 1 includes an outer tubular electrode 12 and an inner tubular electrode 14 spaced inwardly of the outer electrode and sharing a common longitudinal axis. The two electrodes 12 and 14 are mounted between lower and upper insulating blocks 16 and 18. The electrodes 12 and 14 are respectively provided with electrical connections 20 and 22. The tubular electrodes 12 and 14 may be made of various commonly used electrode construction materials; e.g., graphite, but are preferably formed of titanium which is resistant to corrosive action by the contents of the cell and has greater strength and resistance to mechanical shock than graphite electrodes. Graphite electrodes, while they may be used, are more subject to erosion than the titanium structure. The electrolytically exposed surface of the electrode 12 or 14 which serves as the anode is covered with a thin platinum or similar noble metal corrosion resistant surface.

In the particular structure illustrated, the outer electrode 12 is provided at its opposite ends with outwardly turned circular flanges 26 and 28. The respective flanges 26 and 28 are joined to plastic or inorganic gasket insulation pads 30 and 32 by bolts 33, the respective gaskets, in turn, being held to the adjoining insulating blocks 16 and 18. The inner electrode 14 is somewhat longer than the outer electrode 12 and is provided with external threads at its opposite ends. The opposite ends of the inner electrode 14 are threadedly held in centrally located holes 34 and 36 in the respective insulating blocks 16 and 18. Plastic, non-conducting pipe fittings 38 and 40 are connected to the respective opposite ends of the inner electrode 14.

A tubular diaphragm 42 is located in an annular electrolytic space or zone 43 located between the inner electrode 14 and the outer electrode 12. The tubular diaphragm 42 divides the electrolytic zone 43 into two compartments which in the particular embodiment illustrated comprise an inner anode compartment 44 and an outer cathode compartment 46. Preferably, the electrolytic cell of the invention is operated with the inner electrode 14 serving as the anode and the outer electrode 12 as the cathode. It will be appreciated that the cell may be operated in a reverse fashion with the inner electrode 14 acting as the cathode and the outer electrode 12 as the anode. The tubular electrodes and diaphragm preferably take the form of a cylinder but may be provided in other cross sections, e.g., square or rectangular for which case the surfaces should be planar.

Diaphragm 42 extends only part way up the length of the cell. The diaphragm may be made of felt or cloth of asbestos, Teflon, polyvinyl chloride and other plastics which will withstand the corrosive conditions of the cell. Preferably, the diaphragm is an ionic membrane which is selective to the passage of certain ions. Each of the foregoing diaphragms will shield the anode from the agitation of the hydrogen gas generated at the cathode. The diaphragm substantially prevents mixing of the catholyte and anolyte and provides a region around the anode which is favorable to the generation of chlorine and minimizes undesired side reactions. Mixing of the catholyte and anolyte, which is necessary for the production of sodium hypochlorite, occurs in a separate region of the cell above the diaphragm 42.

The diaphragm 42 at its lower end is joined to a spacer ring 47 made of plastic which rests on the floor of the electrolytic zone 43 provided by the upper surface of the insulating block 16. The upper end of the diaphragm 42 is joined to the lower end of a cylindrical insulation member 50. The cylindrical member 50, being made of non-conducting plastic, breaks the electric circuit between the two electrode members 12 and 14 in the upper portion of the cell and provides a nonelectrolytic reaction zone 51 within its confines for the reaction of the sodium hydroxide of the catholyte and the chlorine of the anolyte. The reaction zone 51 is purposely given a thin cross section to facilitate cooling of the liquid therein. The upper end of the cylindrical member 50 is closed and threadedly held to the upper end of the inner electrode 14 immediately adjacent the inside face of the top insulation block 18. The lower end of the plastic cylindrical member is nearly closed by a plastic ring 52 having a cross-sectional configuration of a wedge with the point of the wedge closely spaced to the electrode (anode) 14 to provide a small annular passage for the upward flow of anolyte from the anode compartment 44.

The cylindrical member 50 adjacent its upper end, in some designs, is provided with a ring of spaced holes 58 in its wall which permit passage of hydrogen gas from the outer space about the plastic cylindrical member 50 into the head space of the reaction zone 51 in the interior of the member 50. The lower end of the plastic cylindrical member 50, as best seen in FIG. 2, is provided with a number of liquid passages 60 around the periphery which permit flow of liquid from the exterior of the cylindrical member to the reaction zone 51 therein. Fluid is withdrawn from the reaction zone 51 through an outlet plastic pipe 62 which is threadedly connected to the cylindrical member 50 through a hole 64 of the cylindrical member. In the particular embodiment illustrated in FIG. 1, the liquid withdrawal pipe 62 is supported within an outer pipe 66 by a collar spacer 68 which blocks fluid passage through the annulus between the inner and outer pipes 62 and 66.

Brine solution is introduced to the anode compartment 44 between the diaphragm 42 and the inner electrode 14 through a plastic inlet pipe 69 through a hole in the lower insulating block 16. To avoid possible channeling of the brine solution in its passage through the anode compartment, and to impart to it a general tangential circular flow, there is provided a horizontally disposed baffle 64 near the brine inlet, which baffle in plan comprises an arc of a circle of about 30°. A water inlet line 68 enters into the cathode compartment 46 and is fed through a hole in the lower insulation block 16. The cathode compartment 46 is provided with a water inlet baffle 70 generally resembling and serving the same purpose as baffle 64 of the anode compartment.

An especially desirable feature of the electrolytic cell of the invention is the manner in which the anode and the cathode serve multipurposes. The inner electrode 14, which is preferably the anode, also serves as a conducting tube for the water used to cool both the electrolytic and the reaction sections of the cell. The outer electrode 12 serves as a cathode as well as the outer shell of the electrolytic cell and in addition provides an air-cooled surface for the dissipation of heat. As a result of the design of the structure it is possible to hold both the anode and the cathode at low temperatures and this is important in obtaining high conversions to sodium hypochlorite.

The use of a single corrosion resistant structural member 14 for the combined purposes of conducting the cooling fluid, as an electrode and for cooling the reaction section 51, results in a very simple design. This in turn leads to a low cost of manufacture for the device, as well as providing the means for an improved process for producing sodium hypochlorite. The concept of employing a common vessel, suitably compartmentalized, for both the electrolytic and reaction sections simplifies manufacture, reduces maintenance and space requirements.

Platinized or platinum coated titanium is preferably used for the anode. This is, of course, a less expensive construction than an all-platinum electrode. Should the platinum layer be destroyed or pitted, the titanium support is not corroded away. This is an important property of titanium and makes it usable in corrosive chloride environment where practically all but the noble metals fail. Zirconium is an equally adequate substitute. Titanium is coated with platinum for anode usage also since there is a tendency for the titanium to form an oxide protective coating which will interfere with the transfer of the electricity. This does not happen where the titanium is used as a construction material for the cathode, although a platinum coated cathode also may be used. The platinum coating is a good electrical conductor and has excellent corrosion resistance. The various structural materials used for construction of the cell internals must be able to withstand the severe corrosion and temperature conditions existing. Salt, sodium hypochlorite, chlorine and sodium hydroxide are all present at various locations. The most suitable materials are certain of the new plastics. Examples of suitable materials are the polyvinyl chlorides, Penton and Teflon (fluorinated hydrocarbons). Teflon is the most versatile with regard to corrosion and temperature, but its cost is significantly higher. As a result, rigid polyvinylchlorides are favored of the plastic materials available today. In addition to strictly organic plastics, various inorganic-plastic compositions which provide better temperature characteristics may be employed, or strictly inorganic materials may be used. Examples of the latter are asbestos-cement compositions coated with a resistant composition.

The most effective type of diaphragm for use in the electrolytic cell of the invention is an ion exchange membrane which allows passage of sodium ions but restricts migration of the chlorine and hydroxyl ions. The more effective the membrane is in separating the anolyte and catholyte and restricting passage of the chlorine ions, the less the amount of sodium chloride per unit of active chlorine produced and the higher the concentration of the sodium hypochlorite attained in the product stream. Particularly suitable ion exchange materials for use in the diaphragm are described in Reissue Patent No. 24,865, Juda et al. The use of the ion exchange membrane permits a more complete electrolysis of the sodium chloride in the brine than is possible with other diaphragms and also assures a low chloride content in the sodium hydroxide of the catholyte. The back passage of hydroxyl ions into the anolyte is minimized by the use of the ion exchange membrane. This is a desirable feature as the amount of oxygen discharged at the anode is thus reduced along with the formation of sodium chlorate. Liberation of oxygen at the anode reduces the efficiency of the cell and is hence to be avoided where possible.

The process of the invention for the manufacture of sodium hypochlorite employing the above described electrolytic cell will be more readily understood with reference to the schematic representation of FIG. 3. A saturated sodium chloride brine, containing typically about 25–26% sodium chloride at 20° C., is introduced to the anode compartment 44 through the base of the electrolytic cell. Cooling water having a temperature typically of less than 45° or desirably less than 40° is admitted to the anode 14. This cooling water cools the anode compartment and reaction zone directly at a point where heat is developed and thereby insures good temperature control. Simultaneously, water is supplied to the cathode compartment 46. The water introduced to the cathode compartment 46 serves to dilute the caustic formed therein. The ion exchange membrane 42 preferably used in the process permits passage of sodium ions thereacross and impedes migration of the hydroxyl and chlorine ions. Upon electrolysis of the brine, chlorine ions are attracted to the anode 14 where they give up electrons and form chlorine gas. Within the cathode compartment 46, water is electrolyzed to produce hydrogen gas and caustic soda from the sodium ions. There is some migration of water across the membrane with the sodium ions migration from the anode compartment 44 to the cathode compartment 46. However, this water is inadequate to supply that needed for the dilution of the caustic manufactured in the cathode compartment.

The volume of the reaction compartment 51 is reduced when the anolyte contains a maximum of dissolved chlorine and the reaction composition is free of hydrogen or oxygen gas; dissolved chlorine and chlorine gas are thus more readily available for reaction with the caustic. The cell of the invention in its preferred use is operated to provide conditions which assure maximum chlorine solubility and sodium chloride utilization in the exiting anolyte stream. Under the preferred operating conditions, the salt content of the spent brine is preferably less than 10% and desirably in the range of 2 to 5%. At 20° C. a brine containing approximately 3% sodium chloride will dissolve approximately four times more chlorine than a brine of 26% sodium chloride. Conventionally, caustic-chlorine cells reduce the salt content of the saturated brine input stream only a few percent resulting in a spent brine which still contains more than 20% sodium chloride. Sodium hypochlorite cells heretofore commercially used have employed strong brines as the feed stream and have reduced the salt content only a few percent, thereby giving a product with a high salt to "available chlorine" ratio.

The preferred manner of operating the cell of the invention also reduces the amount of sodium chloride used in the manufacture of the sodium hypochlorite. Two to 2.5 parts of sodium chloride are used typically in the process of the invention for the manufacture of one part of sodium hypochlorite. A prior art sodium hypochlorite cell using no diaphragm will require 5 to 10 parts by weight of sodium chloride per one part of sodium hypochlorite or "available chlorine" produced and a product with a correspondingly high amount of contained salt.

It should be understood that operation at higher temperatures than those specified in the preceding is not outside the spirit of this invention. Elevated temperatures and long retention times bring about the decomposition of sodium hypochlorite, but can still give acceptable yields for many uses and is still far better than prior art if the time is not too long before use or cooling. For the case where chlorine gas and sodium hydroxide are the products, higher temperatures in the range of 90–95° C. can be used without serious disadvantage, aside from the deleterious effect on the life of the ionic membrane from high temperature operation over an extended period of time.

The electrolytic section and, in particular, the anode compartment 44 are maintained at a low temperature, preferably less than 50° C. High temperatures favor sodium chlorate formation within the anode compartment from the hypochlorous acid which is also produced to some extent. Lower temperatures at which the cell preferably operates reduce conversion or loss of the hypochlorous acid to chlorate. The low temperature operation of the cell of the invention contrasts with the high temperature operation of 95° C. and thereabouts of a typical caustic-chlorine cell.

It is desirable to separate the hydrogen gas from the caustic of the catholyte before the catholyte is mixed with the chlorine-containing anolyte. Reference to FIG. 1 will show that the cell of the invention is operated with an overhead gas space into which the hydrogen gas of the catholyte may escape. The hydrogen gas being generated at the surface of the cathode 12 tends to stay in the vicinity of the cathode with the upward movement of the catholyte. The liquid phase of the catholyte is introduced to the reaction zone 51 through the liquid passages 60 in the wall of the plastic cylindrical member 50. As best seen in FIG. 1, the caustic of the catholyte is directed into the rising anolyte stream to mix at the surface of the anode 14 through which the cooling water passes. The bringing together of the anolyte and catholyte streams into the close proximity of the cooled boundary of the reaction zone 51 is another desirable feature of the cell of the invention. The reaction of the sodium hydroxide and chlorine of the respective streams at a reduced temperature minimizes undesirable side reactions such as the formation of unwanted sodium chlorate.

In the particular embodiment illustrated in FIG. 1, the hydrogen gas from the head space passes through the ports 58 to the interior of the reaction zone 51 where it is removed along with the product stream containing sodium hypochlorite and spent brine. The product steam will also contain sodium chloride produced in the reaction of the chlorine and sodium hydroxide in the reaction zone 51. In the cell of FIG. 3, the hydrogen is removed directly from the cell head space and is not directed to the reaction zone 51 for removal with the product stream. It will be seen in FIG. 3 that the lower portion of the outer pipe 66 is closed with a partial baffle 71 which blocks passage of the liquid catholyte through the outer pipe 66 but permits passage of the hydrogen gas.

The ease with which the cell can be converted to a chlorine-caustic soda generator is an important feature. This is achieved simply by blocking passages 58 and 60 of the plastic cylindrical member 50 and separately withdrawing the anolyte and catholyte which are fractionated respectively into chlorine and brine, and caustic and hydrogen.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:
1. A method of producing sodium hypochlorite through electrolyzing an aqueous brine solution, said method comprising:
provining an electrolytic zone divided by an ion exchange membrane into an inner annular first electrode compartment about a tubular first electrode and an outer annular second electrode compartment, said ion exchange membrane allowing migration of sodium ions and restricting passage of chloride and hydroxyl ions thereacross with one of said electrode compartments comprising a cathode compartment and the other an anode compartment;
introducing water to the cathode compartment and a saturated sodium chloride brine solution to the anode compartment and electrolyzing said solution to provide an anolyte containing chlorine and spent brine and a catholyte of sodium hydroxide;
providing a reaction zone adjacent to the electrolytic zone with a boundary of the reaction zone being cooled, said boundary comprising an extension of the tubular first electrode beyond the electrolytic zone;
cooling said electrolytic zone and reaction zone by passage of water through the tubular electrode and carrying on the electrolysis to reduce the salt content of the spent brine to less than 15%; and
flowing streams of the anolyte and catholyte to the reaction zone and there combining the two streams to react the sodium hydroxide and chlorine to produce sodium hypochlorite, said reaction zone being maintained at a temperature of less than 50° C. to minimize formation of sodium chlorate.

2. A method of producing sodium hypochlorite through electrolyzing an aqueous brine solution, said method comprising:
providing an electrolytic zone divided by a tubular ion exchange membrane into an inner annular first electrode compartment about a tubular first electrode and an outer annular second electrode compartment, said ion exchange membrane allowing migration of sodium ions and restricting passage of chloride ions thereacross with one of said electrode compartments comprising a cathode compartment and the other an anode compartment;
introducing water to the cathode compartment and a saturated sodium chloride brine solution to the anode compartment and electrolyzing said solution to provide an anolyte containing chlorine and spent brine and to a catholyte of sodium hydroxide and hydrogen;
providing a reaction zone adjacent to the electrolytic zone with the boundary of the reaction zone being cooled, said reaction zone boundary comprising an extension of the tubular first electrode beyond the electrolytic zone;
cooling said electrolytic zone and reaction zone by passage of cooling water having a temperature of less than 50° C. through the tubular electrode and carrying on the electrolysis to reduce the salt content of the spent brine to less than 10%; and
flowing anolyte and catholyte to the reaction zone and there combining the two streams, causing reaction of the sodium hydroxide and chlorine to produce sodium hypochlorite, said reaction zone being maintained at a temperature of less than 50° C. to minimize decomposition of sodium hypochlorite.

3. A method of producing sodium hypochlorite solution through electrolyzing an aqueous brine solution, said method comprising:
providing an electrolytic zone divided by a membrane into an inner anode compartment about a tubular anode and an outer cathode compartment, said membrane allowing migration of sodium ions and restricting passage of chloride ions thereacross;
introducing a concentrated sodium chloride brine solution to the anode compartment and electrolyzing said solution to provide an anolyte containing chlorine and spent brine and a catholyte of sodium hydroxide;
providing a reaction zone adjacent to the electrolytic zone with a boundary of the reaction zone being cooled, said reaction zone boundary comprising an extension of the tubular anode beyond the electrolytic zone;
cooling said electrolytic zone and reaction zone by passage of water through the tubular anode and carrying on the electrolysis to reduce the salt content of the spent brine to less than 10%; and
flowing streams of the anolyte and catholyte to the reaction zone, there combining the two streams to react the sodium hydroxide and chlorine to produce sodium hypochlorite, said reaction zone being maintained at a temperature of less than 40° C. to minimize decomposition of sodium hypochlorite.

4. A method of producing sodium hypochlorite solution through electrolyzing an aqueous brine solution, said method comprising:
providing an electrolytic zone divided by a tubular ion exchange membrane into an inner annular anode compartment about a tubular anode and an outer annular cathode compartment, said ion exchange membrane allowing migration of sodium ions and restricting passage of chloride and hydroxyl ions thereacross;
introducing water to the cathode compartment and a concentrated sodium chloride brine solution to the anode compartment and electrolyzing said solution to provide an anolyte containing chlorine and spent brine and a catholyte of sodium hydroxide and hydrogen;
providing a reaction zone adjacent to the electrolytic zone, with the boundary of the reaction zone being cooled, said boundary comprising an extension of the tubular anode beyond the electrolytic zone;
cooling said electrolytic zone and reaction zone by passage of water through the tubular anode and carrying on the electrolysis to reduce the salt content of the spent brine to less than 5%;
separating hydrogen from the catholyte; and
thereafter flowing anolyte and catholyte to the reaction zone and there combining said anolyte and catholyte, causing reaction of the sodium hydroxide and chlorine to produce sodium hypochlorite, said reaction zone being maintained at a temperature of less than 40° C. to minimize decomposition of sodium hypochlorite.

5. A method of producing sodium hypochlorite through electrolyzing an aqueous brine solution, said method comprising:
providing an electrolytic zone divided by a tubular ion exchange membrane into an inner annular first electrode compartment about a tubular first electrode and an outer annular second electrode compartment, said ion exchange membrane allowing migration of sodium ions and restricting passage of chloride ions thereacross with one of said electrode compartments comprising a cathode compartment and the other an anode compartment;
introducing a saturated sodium chloride brine solution to the anode compartment and electrolyzing said solution to provide an anolyte containing chlorine and spent brine and a catholyte of sodium hydroxide;
cooling said electrolytic zone by passage of water through the tubular electrode and carrying on the electrolysis to reduce the salt content of the anolyte to less than 10%;
providing a reaction zone immediately adjacent to the electrolytic zone with a boundary of the reaction zone being cooled, said boundary comprising an extension of the tubular first electrode beyond the electrolytic zone; and removing streams of anolyte and catholyte from the electrolytic zone to the reaction zone and bringing the two streams into contact in the immediate proximity of the cooled boundary of the reaction zone and there reacting the sodium hydroxide and chlorine to produce sodium hypochlorite, said reaction being carried on at a temperature of less than 40° C. to minimize sodium hypochlorite decomposition.

6. A method of producing sodium hypochlorite through electrolyzing an aqueous brine solution, said method comprising:

providing an electrolytic zone divided by a tubular ion exchange membrane into an inner annular first electrode compartment about a tubular first electrode and an outer annular second electrode compartment, said ion exchange membrane allowing migration of sodium ions and restricting passage of chloride ions thereacross with one of said electrode compartments comprising a cathode compartment and the other an anode compartment;

introducing water to the cathode compartment and a saturated sodium chloride brine solution to the anode compartment and electrolyzing said solution to provide an anolyte containing chlorine and spent brine and a catholyte of sodium hydroxide and hydrogen;

cooling said electrolytic zone by passage of water through the tubular anode and carrying on the electrolysis to reduce the salt content of the anolyte to less than 10%;

separating hydrogen from the catholyte;

providing a reaction zone immediately adjacent to the electrolytic zone with a boundary of the reaction zone being cooled, said reaction zone boundary comprising an extension of the tubular first electrode beyond the electrolytic zone; and passing anolyte and catholyte to the reaction zone and bringing said catholyte and anolyte into contact in the immediate proximity of the cooled boundary of the reaction zone and there reacting the sodium hydroxide and chlorine to produce sodium hypochlorite, said reaction being carried on at a temperature of less than 40° C. to minimize sodium hypochlorite decomposition.

7. A method of manufacturing sodium hypochlorite from a sodium chloride brine of at least 15% concentration, said method comprising:

providing an elongated cooling zone enclosed by a titanium tube having placed thereabout and sequentially disposed an electrolytic zone opening into a reaction zone about said titanium tube beyond the electrolytic zone with said electrolytic zone divided by a tubular ion exchange membrane into an annular, inner electrode compartment about said titanium tube and an outer electrode compartment enclosed by another titanium electrode, said ion exchange membrane permitting migration of sodium ions and inhibiting passage of chlorine ions thereacross;

introducing water to one of the electrode compartments and the brine to the other electrode compartment and electrolyzing said brine and water to obtain a catholyte of sodium hydroxide and an anolyte of chlorine and exhausted brine having a salt content of less than 10%;

passing cooling water through the inner electrode and closed by another titanium electrode, said ion exaction zone at temperatures less than 50° C.; and removing the two streams from the electrolytic zone and introducing them to the reaction zone and there reacting the sodium hydroxide and chlorine to produce sodium hypochlorite.

8. A method in accordance with claim 7 wherein hydrogen is separated from the catholyte before introduction of the liquid catholyte to the reaction zone.

9. In an electrolytic cell for the manufacture of sodium hypochlorite or chlorine, the structure comprising:

two tubular electrodes of different sized cross-sections and having a common longitudinal axis, said electrodes being mounted between an upper and a lower insulating block with the inner electrode opening at its opposite ends through the respective insulating blocks to provide a substantially straight fluid passage therethrough;

a tubular diaphragm disposed between said tubular electrodes and sharing the same longitudinal axis, said diaphragm dividing the space between the two tubular electrodes into an anode compartment and a cathode compartment;

means for introducing liquid to the cathode and anode compartments; and means for passing a cooling liquid through the inner one of the two tubular electrodes.

10. An electrolytic cell in accordance with claim 9 wherein the tubular diaphragm is an ion exchange membrane that allows migration of sodium ions and restricts passage of chloride ions thereacross.

11. An electrolytic cell in accordance with claim 9 wherein the inner electrode is provided with spaced external threads which threadably engage centrally located holes of the upper and lower insulating blocks, respectively.

12. An electrolytic cell in accordance with claim 9 wherein the outer electrode forms an outer surface of the cell structure.

13. A cell for the manufacture of sodium hypochlorite, said cell comprising:

two tubular electrode members having a common longitudinal axis mounted between an upper and a lower insulating block;

a tubular diaphragm disposed between said two tubular electrodes and sharing the same longitudinal axis, said diaphragm dividing the space between the tubular electrodes into an anode compartment and a cathode compartment with the effective length of said tubular diaphragm being less than the length of the two electrodes, thus providing a gap between an end of the membrane and one of the insulating blocks;

a tubular insulation member spaced in the gap between the tubular diaphragm and said one of the insulating blocks, said insulation member in its interior providing a reaction zone about the inner one of the tubular electrode members;

means for passing cooling water through the inner one of the tubular electrode members;

means for introducing water to the cathode compartment and brine to the anode compartment;

passage means for introducing a catholyte stream from the cathode compartment and an anolyte stream from the anode compartment to the reaction zone defined by the tubular insulation member; and means for withdrawing a product stream from the reaction zone to the exterior of the electrolytic cell.

14. A cell in accordance with claim 13 wherein the diaphragm is an ion exchange membrane that allows migration of sodium ions and restricts passage of chloride and hydroxyl ions thereacross and the electrode members are made of titanium.

15. A cell for the manufacture of sodium hypochlorite, said cell comprising:

two tubular electrode members having a common longitudinal axis mounted between an upper and a lower insulating block;

a tubular diaphragm disposed between said two tubular electrodes and sharing the same longitudinal axis, said diaphragm dividing the space between the tubular electrodes into an anode compartment and a cathode compartment with said tubular diaphragm being shorter than the two electrodes, thus providing a gap between an end of the membrane and one of the insulating blocks;

a tubular insulation member spaced in the gap between the tubular diaphragm and said one of the insulating blocks, said insulation member in its interior providing a reaction zone;

means for passing cooling water through the inner one of the tubular electrode members;

means for introducing brine to the anode compartment;

passage means for introducing a catholyte stream from the cathode compartment and an anolyte stream from the anode compartment to the reaction zone defined by the tubular insulation member; and means for withdrawing a product stream from the reaction zone to the exterior of the electrolytic cell.

16. In an electrolytic cell, the combination comprising:

two tubular electrode members having a common longitudinal axis mounted between an upper and a lower insulating block;

a tubular diaphragm disposed between said two tubular electrodes and sharing the same longitudinal axis, said diaphragm dividing the space between the tubular electrodes into an anode compartment and a cathode compartment with the effective length of said tubular diaphragm being shorter than the two electrodes, thus providing a gap between an end of the membrane and one of the insulating blocks;

a tubular insulation member spaced in the gap between the tubular diaphragm and said one of the insulating blocks, said insulation member in its interior providing a reaction zone about the inner one of the electrode members; and means for passing cooling water through the inner one of the tubular electrode members.

17. An electrolytic cell in accordance with claim 16 wherein the tubular electrode members are made of titanium.

References Cited
UNITED STATES PATENTS

| | | | |
|---|---|---|---|
| 559,454 | 5/1896 | Kellner | 204—95 |
| 892,983 | 7/1908 | Digby | 204—95 |
| 914,856 | 3/1909 | Meyer | 204—260 |
| 2,193,323 | 3/1940 | Nitzschke et al. | 204—260 |
| 2,967,807 | 1/1961 | Osborne et al. | 204—98 |
| 3,055,811 | 9/1962 | Ruff | 204—98 |

HOWARD S. WILLIAMS, *Primary Examiner.*

JOHN H. MACK, *Examiner.*

H. M. FLOURNOY, *Assistant Examiner.*